United States Patent
Airaud et al.

(10) Patent No.: US 7,698,537 B2
(45) Date of Patent: Apr. 13, 2010

(54) DATA PROCESSING APPARATUS FOR PROCESSING A STREAM OF INSTRUCTIONS IN FIRST AND SECOND PROCESSING BLOCKS WITH THE FIRST PROCESSING BLOCK SUPPORTING REGISTER RENAMING AND THE SECOND PROCESSING BLOCK NOT SUPPORTING REGISTER RENAMING

(75) Inventors: Cédric Denis Robert Airaud, St Laurent du Var (FR); Melanie Emanuelle Lucie Vincent, Grasse (FR); Luc Orion, Mouans Sartoux (FR); Norbert Bernard Eugene Lataille, Le Cannet (FR)

(73) Assignee: ARM Limited, Cambridge (GB)

( * ) Notice: Subject to any disclaimer, the term of this patent is extended or adjusted under 35 U.S.C. 154(b) by 481 days.

(21) Appl. No.: 11/641,959

(22) Filed: Dec. 20, 2006

(65) Prior Publication Data

US 2008/0155238 A1    Jun. 26, 2008

(51) Int. Cl.
*G06F 9/00* (2006.01)
(52) U.S. Cl. .................. 712/218; 712/32; 712/233; 712/244
(58) Field of Classification Search .............. 712/34, 712/218, 234, 244, 233
See application file for complete search history.

(56) References Cited

U.S. PATENT DOCUMENTS 6,289,442 B1 * 9/2001 Asato ..................... 712/239
2008/0046692 A1 * 2/2008 Michalak et al. .......... 712/214
2008/0059765 A1 * 3/2008 Svendsen et al. .......... 712/34

* cited by examiner

Primary Examiner—David J Huisman
(74) Attorney, Agent, or Firm—Nixon & Vanderhye P.C.

(57) ABSTRACT

A data processing apparatus processes a stream of instructions from an instruction set. The instruction set includes exception instructions and non-exception instructions. Exception instructions may cause a break in an instruction flow, and non-exception instructions execute in a statically determinable way. At least two processing blocks process instructions from the stream of instructions. A first processing block has a set of physical registers associated with it for storing data values being processed by the first processing block. Renaming circuitry associated with the first processing block maps architectural registers specified in instructions to be processed by the first processing block to physical registers within the set of physical registers. A second processing block has a set of physical registers associated with it for storing data values being processed by the second processing block. The second processing block and registers do not support renaming. Control circuitry identifies exception instructions in the instruction stream and detects when the exception instructions have been committed. The second processing block receives signals from the control circuitry and suspends processing of an instruction in the second processing block until all preceding exception instructions have been committed.

18 Claims, 6 Drawing Sheets

DATA PROCESSING APPARATUS FOR PROCESSING A STREAM OF INSTRUCTIONS IN FIRST AND SECOND PROCESSING BLOCKS WITH THE FIRST PROCESSING BLOCK SUPPORTING REGISTER RENAMING AND THE SECOND PROCESSING BLOCK NOT SUPPORTING REGISTER RENAMING

FIELD OF THE INVENTION

The field of the invention relates to data processing and in particular to processing using at least two connected processors, at least one supporting register renaming and another not supporting register renaming.

DESCRIPTION OF THE PRIOR ART

It is known to provide processors which process instructions from an instruction set specifying an architectural set of registers using a physical set of registers that is larger than the architectural set. This is a technique that has been developed to try to avoid resource conflicts due to instructions executing out of order in the processor. In order to have compact instruction encodings most processor instruction sets have a small set of register locations that can be directly named. These are often referred to as the architecture registers and in many ARM® (registered trade mark of ARM Ltd Cambridge UK) RISC instruction sets there will be 32 architecture registers.

When instructions are processed different instructions take different amounts of time. In order to speed up execution times, processors may have multiple execution units, or may perform out of order execution. This can cause problems if the data used by these instructions is stored in a very limited register set as a value stored in one register may be overwritten before it is used by another instruction. This leads to write-after-write stalls. In order to address this problem, it is known for some processing cores to perform processing using more registers than are specified in the instruction set. Thus, for example, a core may have 56 physical registers to process an instruction set having 32 architecture registers. This enables a core to store values in more registers than is specified by the instruction set and can enable a value needed by an instruction that takes a long time to be executed to be stored in a register not used by other neighbouring instructions. In order to be able to do this the core needs to "rename" the registers referred to in the instruction so that they refer to the physical registers in the core. In other words an architectural register referred to in the instruction is remapped onto a physical register that is actually present on the core. Although this can be very helpful in an out-of-order processing system, a simpler processing system may prefer to use a limited set of registers, not perform out-of-order execution and not rename any registers. A processing system supporting renaming can update registers on speculative instructions, while a system not supporting renaming cannot do this.

A problem may occur when two processing systems, such as a co-processor not supporting renaming and a core that does are connected. In such a case synchronisation between the two is required in case an exception occurs.

Several solutions to this can be envisaged. One solution would be not to use renaming in either of the systems, however, this would preclude the advantages of renaming from both systems.

An alternative solution would be to rename on both systems, however this would increase the register bank size for the system that did not previously have renaming.

Alternatively, instructions could not be sent to the system not supporting renaming when they are still speculative. This would result in the core being stalled when coprocessor instructions need to be executed. This would be a particular problem in circumstances where the coprocessor is used a lot and is tightly coupled to the core.

It would be desirable to be able to couple a processing system supporting renaming to one that does not without incurring a large penalty on performance or additional logic.

SUMMARY

A first aspect of the present invention provides a data processing apparatus operable to process a stream of instructions from an instruction set, said instruction set comprising exception instructions and non-exception instructions, exception instructions being instructions that may cause a break in an instruction flow and non-exception instructions being instructions that execute in a statically determinable way, said data processing apparatus comprising: at least two processing blocks for processing instructions from said stream of instructions; a first processing block having a set of physical registers associated with it for storing data values being processed by said first processing block, renaming circuitry associated with said first processing block for mapping architectural registers specified in instructions to be processed by said first processing block to physical registers within said set of physical registers; a second processing block having a set of physical registers associated with it for storing data values being processed by said second processing block, said second processing block and registers not supporting renaming; control circuitry configured to identify exception instructions in said instruction stream and to detect when said exception instructions have been committed; said second processing block being configured to receive signals from said control circuitry and to suspend processing of an instruction in said second processing block until all preceding exception instructions have been committed.

When processing a stream of instructions using at least two processing blocks, at least one of them supporting renaming and another not, problems can occur from the instructions in the processor supporting renaming being executed out of order whilst those in the other processor are not. The inventors recognized this problem and realized that it is important that no register be updated by an instruction in the second processing block not supporting register renaming if there is an unresolved exception instruction in front of it in the instruction stream. Control circuitry monitors unresolved exception instructions and detects when they have been committed. The second processing block is then controlled to suspend processing of an instruction if there are any exception instructions in front of it that have not been committed, that is, exception instructions that may still take an exception and cause a break in program flow.

By using control circuitry to ensure that these conditions are met, the second processing block can process the instructions when it is safe to do so without causing an undue delay between the two processing blocks or requiring excessive logic to link them.

It should be noted that instructions, including exception instructions can be executed at least partially by more than one of the at least two processing blocks. Thus, there may not be a stream of instructions going through one block and another distinct stream going through the other. For example, it may be that instructions to be executed by the second processing block are first executed partially by the first processing block before being forwarded to the second processing block, and as such update registers in the first processing block.

In some embodiments, said control circuitry is responsive to detecting an exception instruction generating an exception to generate a flush signal; and said second processing block is responsive to said flush signal to flush instructions in said second processing block subsequent in said instruction stream to said exception instruction generating said exception.

In addition to knowing when exception instructions are committed, it is also important to know when they generate an exception and cause a break in instruction flow. Example embodiments address this by providing control circuitry that detects the generation of an exception and, in response to it, generates a flush signal. The second processing block is responsive to the flush signal to flush instructions subsequent in the instruction stream to the exception instruction that are within the second processing block. Thus, these instructions are removed from the processing block and will not execute.

In some embodiments, said suspension of processing of said instruction by said second processing block is performed just prior to said instruction updating a register.

Although the second processing block could be suspended at a number of points, it is important that an instruction subsequent to an unresolved exception does not update a register. Often updating a register occurs quite late in a second processing block and thus suspending the instruction immediately prior to this operation effectively allows the processing block to proceed for some time and reduces the delay caused by the suspension prior to the exception instruction being resolved.

Although the first and second processing blocks can be a number of things, in some embodiments the second processing block is a coprocessor to said first processing block.

It is quite common in processors to have a main processing block or core that can operate out of order and support register renaming while using a coprocessor to perform particular functions that do not gain from using register renaming, either because their register bank is too large, or because write-after-write interlocks are quite rare.

Although the coprocessor could be a number of things, in some embodiments it is a floating point unit. A floating point unit is often used with a renaming core and such a system benefits greatly.

In some embodiments said data processing apparatus further comprises an exception data store for storing information regarding exception instructions to be processed by said first processing block that are not yet committed; said control circuitry being configured to store information regarding said exception instructions in said exception data store, and to identify instructions in said instruction stream to be processed by said second processing block subsequent to an exception instruction in said instruction stream, and to mark a first instruction to be processed by said second processing block in said instruction stream subsequent to an exception instruction and to mark said exception instruction as a corresponding exception instruction within said exception data store; said second data processing block being responsive to detection of a marked instruction to suspend processing of said marked instruction prior to said marked instruction updating a register until detection of a signal indicating that said corresponding marked exception instruction has been committed.

There are many different ways to store the information regarding the exception instructions and to pass this information on to the second processing block. One possible way is to have an exception data store and to mark instructions. It is only the first instruction that is to be at least partially processed in the second processing block which follows an exception that needs to be marked as once it is judged that this one is safe to execute any instructions following it will also be safe until the next exception is encountered. Thus, it is found to be advantageous to simply mark the first instruction in this manner. The corresponding exception instruction is also marked and then resolution of this exception instruction can be tied to the appropriate instruction in the second processing block.

In some embodiments, said exception data store comprises a FIFO, and said control circuitry is responsive to detection of an exception instruction being committed to mark said exception data store entry corresponding to said exception instruction as committed and to pop said corresponding data entry off said FIFO if said corresponding data entry is at the exit of said FIFO.

In some cases, the exception instructions may be executed out of order and it is important for the second processing block to know when all exception instructions prior to a certain instruction in the instruction stream have been committed. Thus, it is found to be advantageous to use a FIFO as the exception data store and to use control circuitry to mark any of the exception instructions as committed in the data store as they are detected as so being and, when one of them reaches the exit, to pop it out of it. Thus, if the exception data store is filled with exception instructions at a point where they are still in instruction stream order then, even if they are committed in a different order they cannot be popped out of the FIFO and send the information to the second processing block until the instructions in front of them have popped out. Thus, this is an effective way of ensuring that exception instructions are dealt with in the correct order.

In some embodiments, said second processing block is configured to process non-marked instructions until a subsequent marked instruction in a stream of instructions sent to said second processing block is detected and to suspend processing of said second data processing block before said marked instruction updates a register until receipt of a signal indicating said corresponding marked exception instruction is committed.

The marking of instructions for the second processing block that occur after a first exception and only marking the first one that occurs allows the second processing block to only suspend processing in response to marked instructions and, thus, unmarked instructions can be processed without requiring any additional control signals.

In some embodiments, said second processing block comprises a global counter and instruction counters, said second processing block being responsive to receipt of an instruction to update a counter associated with said received instruction with a value of said global counter, and being responsive to receipt of a marked instruction to update said global counter, and being responsive to receipt of a signal indicating that a marked instruction in said exception data store is committed to update said global counter and instruction counters in an opposite direction, said second processing block being responsive to a predetermined value of an instruction counter to determine if said instruction is to be allowed to update a register or not.

One way of ensuring that the control circuitry and second processing block know which instructions correspond to exception instructions that are being committed is to use a counter system. A global counter can, for example, be incremented on receipt of a marked instructions at the second processing block. When any instruction enters the second processing block, an instruction counter associated with it is updated with the global counter value. Any time that a marked instruction in the exception data store is committed and pops out of the exception data store FIFO, the global counter and instruction counters are decremented. The second processing block can respond to a value of zero in an instruction counter to know that it is OK to update a register. It should be noted that although we have discussed the global counter being incremented and decremented and the value being zero, it is clear that the counter could work in a different direction and predetermined values rather than zero could be used.

In some embodiments, said control circuitry is responsive to detecting an exception instruction generating an exception to generate a flush signal; and said second processing block is responsive to detection of a flush signal from said control circuitry to flush instructions from said processing block in dependence upon their counter values.

Similarly, the counter circuitry can be used to indicate when the second processing block is in receipt of a flush signal which instructions are to be flushed. In this case, all instructions having a counter value of greater than zero should be flushed.

In some embodiments, said control circuitry is configured to mark said exception instruction and subsequent second processing block instruction with corresponding flags.

An alternative to using counters is to mark the exception instructions and subsequent second processing block instructions with corresponding flags. The required instructions can then be identified by comparing flags as the exception instruction is popped out of the FIFO. This is effective but requires quite a lot of logic.

In other embodiments, said control circuitry is configured to mark said subsequent second processing block instruction with a flag indicative of a line in said exception data store storing said corresponding exception instruction.

Alternatively, a flag indicative of a line in the exception data store can be used instead of counters to make the connection between instructions in the second processing block and exception instructions.

In some embodiments, said control circuitry comprises a global counter and is configured to analyse said instruction stream prior to said instructions being issued to said processing blocks and to update said counter in response to detection of one of said exception instructions and for each instruction to be processed by said second processing block to update an instruction counter associated with said instruction with a value of said global counter, such that said instruction counter indicates a number of unresolved exception instructions preceding said instruction in said instruction stream; said control circuitry being responsive to detection of an oldest unresolved exception instruction being committed to generate a committed signal; said control circuitry being responsive to said committed signal to update said global counter and instruction counters, said second processing block suspending processing of instructions in dependence upon said instruction counter values.

In some embodiments, instructions are not marked but rather a counter is updated in response to detection of one of the instructions and subsequent instructions that are to be processed by the second processing block get given the value of this counter, such that the instruction counter indicates a number of unresolved exception instructions preceding the instruction in the instruction stream.

By providing control circuitry that detects the oldest unresolved exception instructions being committed and amends the counters accordingly, the second processing block can simply use this one counter to know when to suspend processing of instructions.

In some embodiments, said control circuitry is responsive to detection of an oldest unresolved exception instruction to generate an exception to generate a flush signal; and said second processing block is responsive to said flush signal to flush instructions from said second processing block in dependence upon said instruction counter values.

Similarly, this counter value can be used when an exception is detected to flush the appropriate instructions from the second processing block.

In some embodiments, there are more than one type of exception instructions and they may be processed by different pipelines in the first processing block and, as such, may be resolved out of order with each other. In such a case, it is important that each instruction is dealt with separately in order to know when an exception instruction preceding an instruction in the second processing block has been committed and that all the exception instructions preceding it have also been committed. One way of dealing with this was the exception FIFO. Another way is to use a counter for each type of instruction. These counters are updated depending on the type of instruction identified and on the type of instruction being committed. When the values reach a predetermined value, such as both being zero, it is know that the second processing block can process that instruction. Similarly, these values can be used to know when the instructions can be flushed from the pipeline in the case of an exception having been generated.

In some embodiments, said exception instructions comprises at least one of a load instruction, a store instruction and a branch instruction.

In some embodiments, said first type of exception instruction comprises a load or a store instruction and said second type of instruction comprises a branch instruction.

Typically, load and store instructions are processed in one pipeline and branch instructions in another and, thus, they need separate control circuitry to identify them and identify when they are committed and similarly they need separate counters to enable one to be aware which are being committed as they may be committed out of order with respect to each other.

A second aspect of the present invention provides a method of processing a stream of instructions from an instruction set, said instruction set comprising exception instructions and non-exception instructions, exception instructions being instructions that may cause a break in an instruction flow and non-exception instructions being instructions that execute in a statically determinable way, said instructions being suitable for being processed by at least one of said two processing blocks, a first processing block supporting register renaming and a second processing block not supporting register renaming, said method comprising the steps of: identifying exception instructions in said instruction stream and detecting when they have been committed; and suspending processing of an instruction in said second processing block until all preceding exception instructions in said instruction stream have been committed.

A third aspect of the present invention provides a means for processing a stream of instructions from an instruction set, said instruction set comprising exception instructions and non-exception instructions, exception instructions being instructions that may cause a break in an instruction flow and non-exception instructions being instructions that execute in a statically determinable way, said means for processing comprising: at least two processing means for processing respective instructions from said stream of instructions; a first processing means having a set of physical registers associated with it for storing data values being processed by said first processing means, renaming means associated with said first processing means for mapping architectural registers specified in instructions to be processed by said first processing means to physical registers within said set of physical registers; a second processing means having a set of physical registers associated with it for storing data values being processed by said second processing means, said second processing means and registers not supporting renaming; control means for identifying exception instructions to be processed in said instruction stream and for detecting when said exception instructions have been committed; said second processing means being configured to receive signals from said control means and to suspend processing of an instruction in said second processing means until all preceding exception instructions have been committed.

The above, and other objects, features and advantages will be apparent from the following detailed description of illustrative embodiments which is to be read in connection with the accompanying drawings.

DESCRIPTION OF THE PREFERRED EMBODIMENTS

Figure 1:
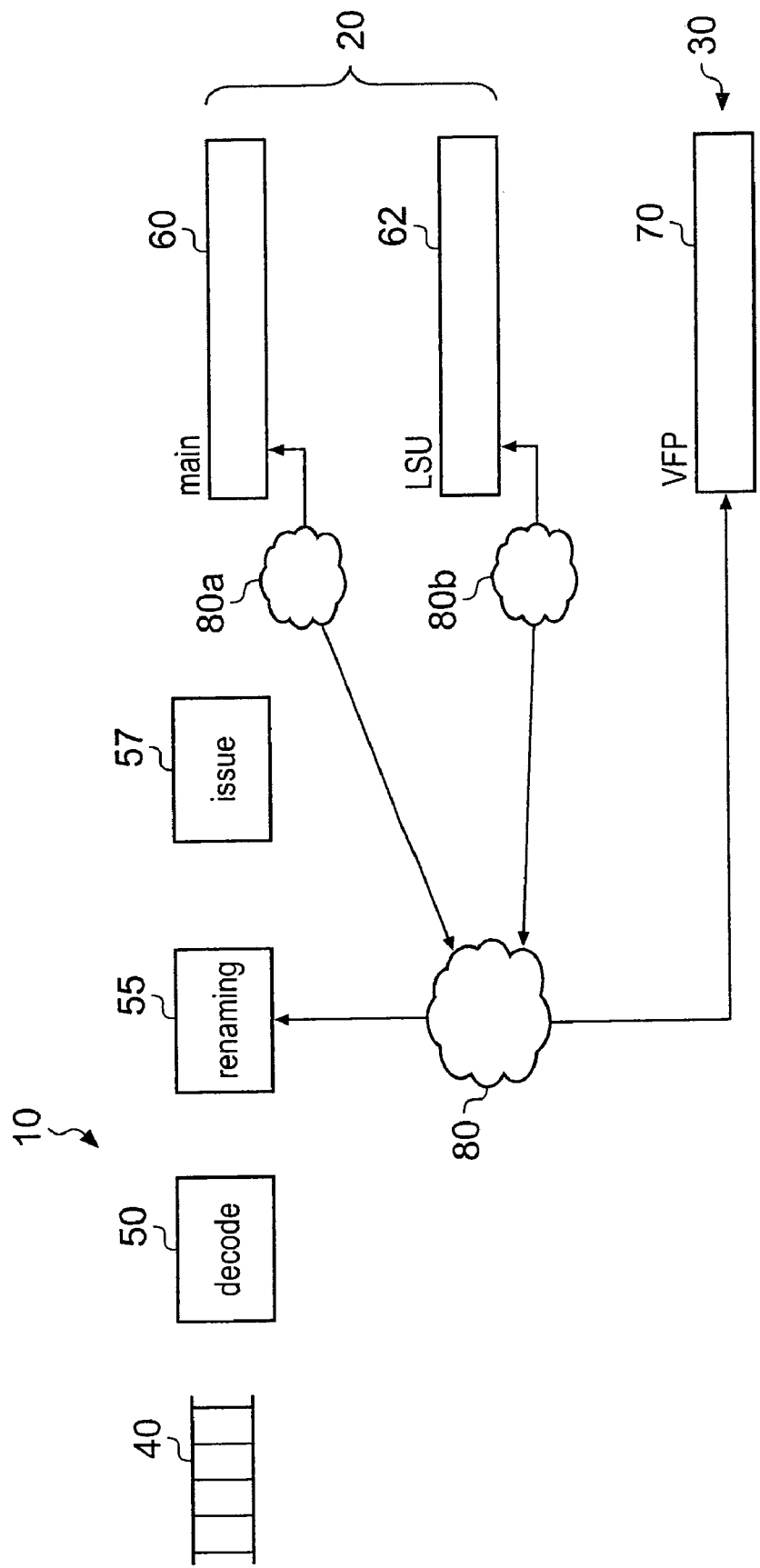
FIG. 1 schematically shows a data processing apparatus according to an example embodiment.

FIG. 1 shows a data processing apparatus 10 according to an example embodiment. Data processing apparatus 10 comprises a main core 20 connected to a co-processor VFP unit 30. An instruction stream 40 is received at decode stage 50, passes through renaming stage 55 to issue stage 57. At issue stage 57 the decoded instructions are sent to the appropriate execution unit which may be the main ALU 60 within the core 20 or the load store unit 62 within core 20 or it may be to the VFP execution stage 70 within VFP unit 30. Once the instructions have been issued the instructions being processed by the main core may take one of several routes and thus they may execute out of order. It is for this reason that register renaming stage 55 is present. It should be noted that although two pipeline execution units are shown within core 20 there may clearly be many more than these.

Data processing apparatus 10 further comprises control circuitry 80. This control circuitry 80 is operable to analyse the instruction stream while it is still in order, in this embodiment it does this in the renaming stage 55, to identify any exception instructions and any instructions that are to be processed by the VFP unit 30. Exception instructions are those that may cause a break in instruction flow, for example they may be branch instructions or they may be load or store instructions which can abort. When processing an instruction stream using two processor units, where one uses renaming and one does not, it is important that the instructions that are to be processed by the coprocessor which do not use renaming do not write to any registers while there are still unresolved exception instructions pending ahead of them in the instruction stream. Thus, control circuitry can be used to analyse where exception instructions occur in the instruction stream and also to identify where the VFP instructions are.

Control circuitry 80 comprises further circuitry 80a and 80b, the further circuitry being operable to analyse the exceptions as they are being processed in the various pipelines of the main core 20. These portions of control circuitry 80a and 80b send signals back to the control circuitry 80 to indicate when an exception instruction is committed or when it generates an exception, either by aborting or by branching. When an exception instruction is committed, i.e., it is known how it will execute or it has indeed executed, this information is gathered by control circuitry 80 and sent to VFP unit 30. There is then sufficient information for each VFP instruction to know whether there is a pending unresolved exception instruction ahead of it in the instruction stream or not. If control circuitry 80 indicates there is a pending unresolved exception instruction ahead of a particular instruction, then VFP unit 30 is stalled before this instruction can write to a register. Generally, writing to a register occurs late in the execution pipeline of a VFP unit, and thus, several subsequent instructions can generally be at least partially processed before the VFP unit is stalled.

This is a general embodiment, and there are several different ways that control circuitry can analyse the instructions and send the information back. In particular, it may be that the exception instructions are being processed in different pipelines within core 20 and thus may be resolved out of order. It is important that it can be determined that all the exception instructions in the instruction stream ahead of an instruction to be processed by VFP unit 70 have been resolved before this instruction is allowed to write to a register. Various ways of dealing with this are described in the example embodiments.

Figure 2:
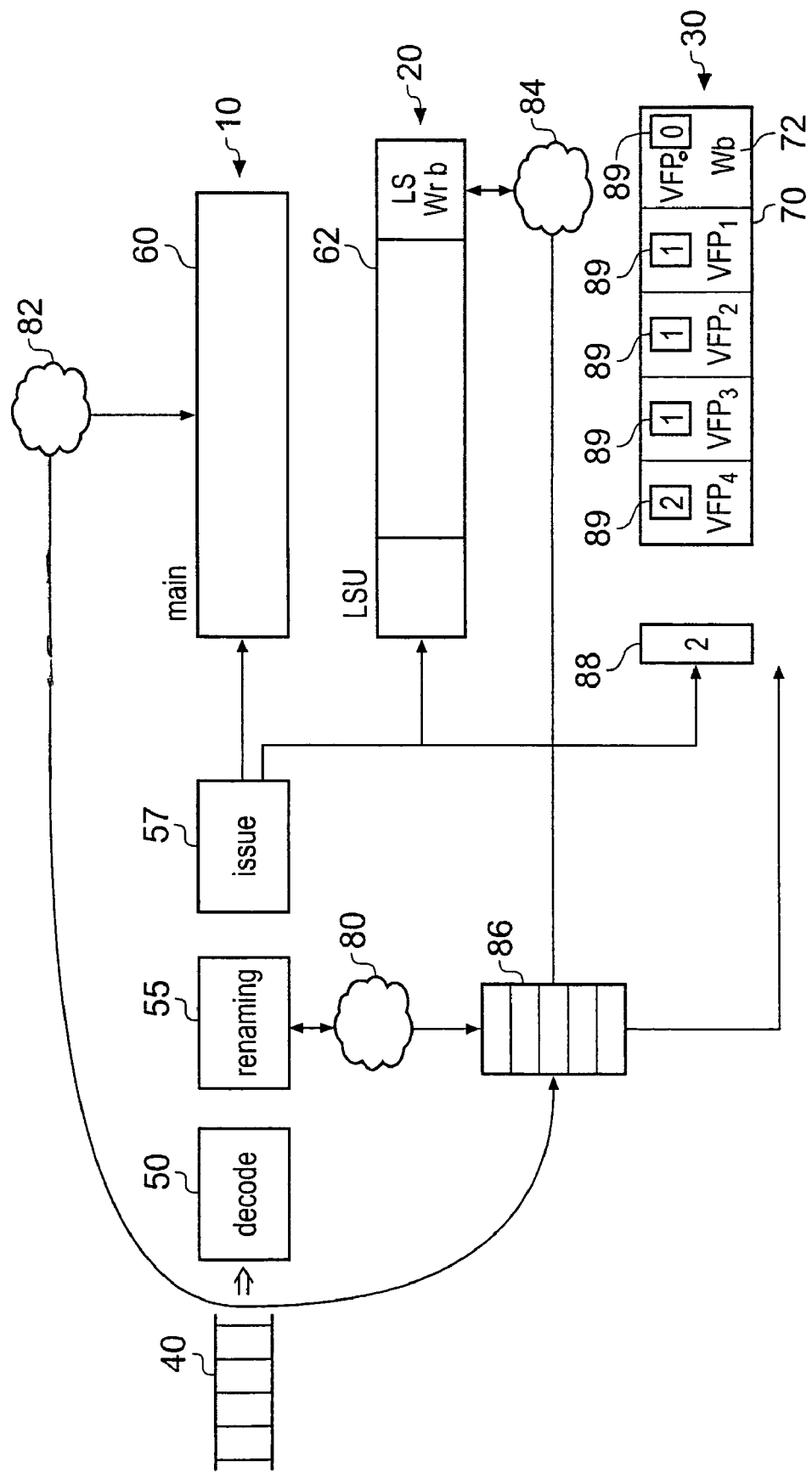
FIG. 2 schematically shows a data processing apparatus according to an alternative example embodiment.

FIG. 2 shows an example embodiment which is similar to the embodiment shown in FIG. 1. This embodiment additionally comprises an exception instruction FIFO 86, branch control logic 82, load store control logic 84, a global counter 88 and instruction counters 89. In this embodiment, control circuitry 80 identifies exception instructions in the instruction stream at renaming stage 55 and enters information about these instructions into exception FIFO 86. This information includes what sort of exception has been identified and potentially a mark value.

Figure 3:
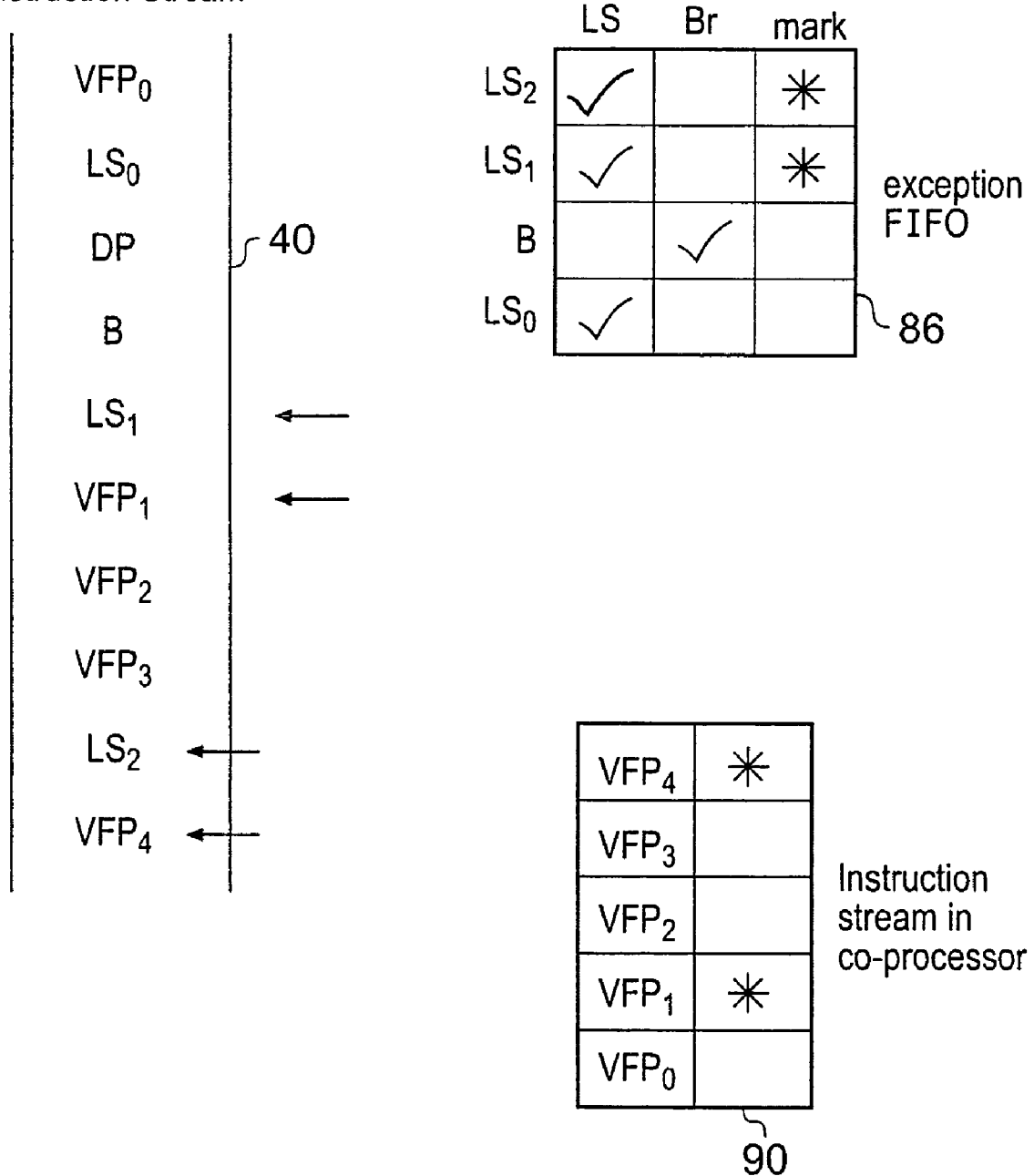
FIG. 3 shows an example instruction stream and an exception FIFO for that instruction stream according to an example embodiment.

FIG. 3 shows exception FIFO 86 in greater detail for an example instruction stream 40. It also shows the portion 90 of instruction stream 40 that is sent to the coprocessor 70. Example instruction stream 40 contains VFP instructions that are to be executed in the VFP unit 70 and instructions that are to be executed in the main core. These include some exception instructions which are load store or branch instructions and some general data processing instructions which are not exception instructions. The control circuitry is interested in the exception instructions that precede a particular floating point instruction. Thus, in this embodiment exception instructions which occur before a floating point instruction and are closest to it are marked (illustrated with an asterisk) as is the floating point instruction following that exception instruction. Floating point instructions occurring after this with no exceptions in between are not marked as once the floating point instruction ahead of them in the instruction stream can execute then so can they as no exception instructions occur between. Thus, in this case the exception FIFO is loaded with information for load store instruction $LS_0$, information for the branch instruction B, information for $LS_1$ and it marks this instruction as there is a floating point instruction immediately following it. The floating point instruction is also marked in the instruction stream that is sent to the coprocessor. Instruction $LS_2$ is then entered in the exception FIFO and marked and the subsequent floating point instruction $VFP_4$ is also marked.

At the coprocessor 70 (see FIG. 2) there is a global counter 88 and there are instruction counters 89 associated with each instruction. When a new marked instruction arrives at the coprocessor 70 the global counter is updated by incrementing it and the instruction counter corresponding to that instruction is given the value of the global counter. When non-marked instructions enter the VFP unit 70 the global counter is not incremented, however a counter associated with these instructions is also given the value of the global counter.

This embodiment also includes branch control logic 82 and load store logic 84. These are operable to analyse the execution in their respective pipelines and in response to detecting that an exception instruction is committed they send a signal to the exception FIFO 86 wherein this exception instruction is marked as committed. If it is at the bottom of the exception FIFO it is popped out of the exception FIFO and a signal is sent to the VFP unit 30 and the global counter and respective instruction counters are decremented. Any instruction having an instruction counter value of zero can be completed. Any instruction that has an instruction counter greater than zero must not write to a register and when such an instruction arrives at the write back stage 72 of this pipeline the pipeline is stalled. Thus, this is a simple yet effective way of dealing with exceptions in a processor that uses renaming. The exception FIFO is used to deal with the fact that exception instructions may be resolved or may abort out of order as they occur in different pipelines.

Logic 82 and 84 are also operable to detect where exception instructions generate an exception. When they detect this they send the information back to exception FIFO 86 and the corresponding instruction is marked as having generated an exception. When it reaches the bottom of the FIFO this information is sent to VFP unit 30 and all instructions that have a counter value of more than zero are cancelled.

It should be noted that for the embodiments described with reference to FIGS. 2 and 3 the values for the counter could be different and the counter could be counting in the opposite direction so that it is decremented and incremented to particular values before an instruction can be completed. This is clearly simply an implementation detail.

In alternative embodiments, instead of having a counter, each floating point unit instruction and the corresponding exception instruction occurring before it in the instruction stream could get the same exception flag. Thus, each time an exception is committed each VFP instruction could update its flag to check if it is speculative or not. This embodiment would require more logic and would be more complex requiring dependency between the main core and the coprocessor than the counter embodiment.

A further alternative would be to give the floating point unit instructions a flag that matches an exception line in the exception FIFO 86. Thus, each time an exception is popped out of the FIFO a signal can be sent to the floating point unit to tell the corresponding instruction that the exception is being committed. A potential draw back with this is the size of the flag required.

Figure 4:
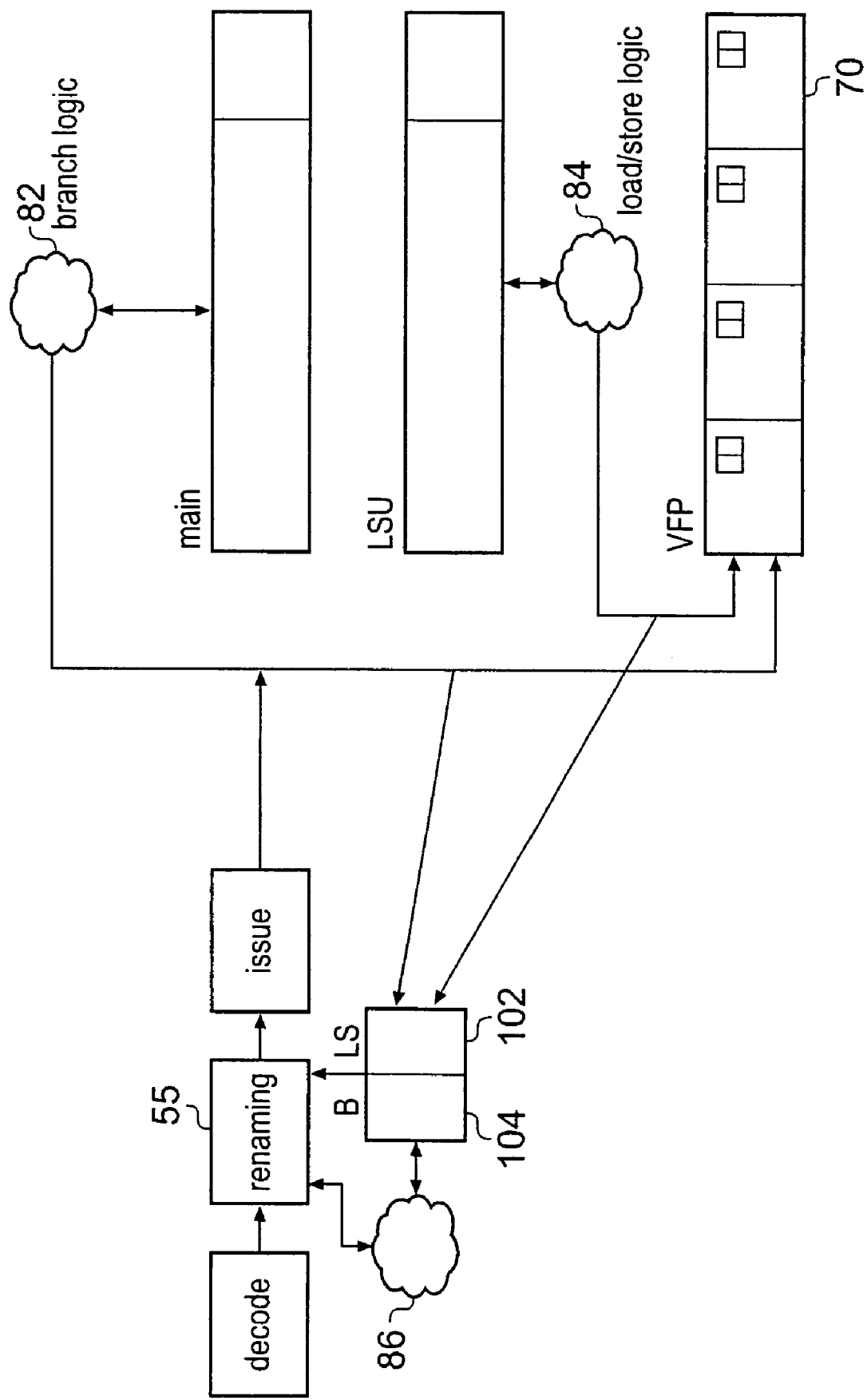
FIG. 4 shows an example embodiment having two counters.

An alternative way of dealing with exception instructions within the instruction stream being processed out of order is instead of using an exception FIFO using two counters 102 and 104 as shown in FIG. 4. These counters are updated at a renaming stage 55 by control circuitry 86 as branch and load store instructions are detected. Instructions passing this stage that are to be processed by the VFP 70 are given counter values that are equal to the values of the global counter at that point. Counter 102 counts load/store instructions and counter 104 counts branch instructions. Branch logic 82 and load/store logic 84 look for exception instructions being committed and/or causing exceptions in their respective pipelines. In response to detecting that they are committed they send a signal to VFP pipeline 70 to decrement the appropriate counter related to each of the instructions. A signal is also sent to the global counter to decrement the appropriate part of it. The VFP unit 70 knows that when the instruction counters corresponding to an instruction are both zero then that instruction can write to a register. If they are not both zero then that instruction must not be allowed to write to a register and if it reaches the write back stage of the pipeline the pipeline is stalled.

In the case that an abort or branch is detected by control logic 82 or 84 all instructions having a value more than zero in the corresponding counter are flushed.

Although the above embodiments have been shown with respect to a floating point unit, it would be clear to the skilled person that any processing block that doesn't use renaming which is in communication with a processing block that does could use this technique to ensure that the instructions being processed by the block that do not use renaming can be processed without causing errors and without causing too much delay to the system.

Figure 5:
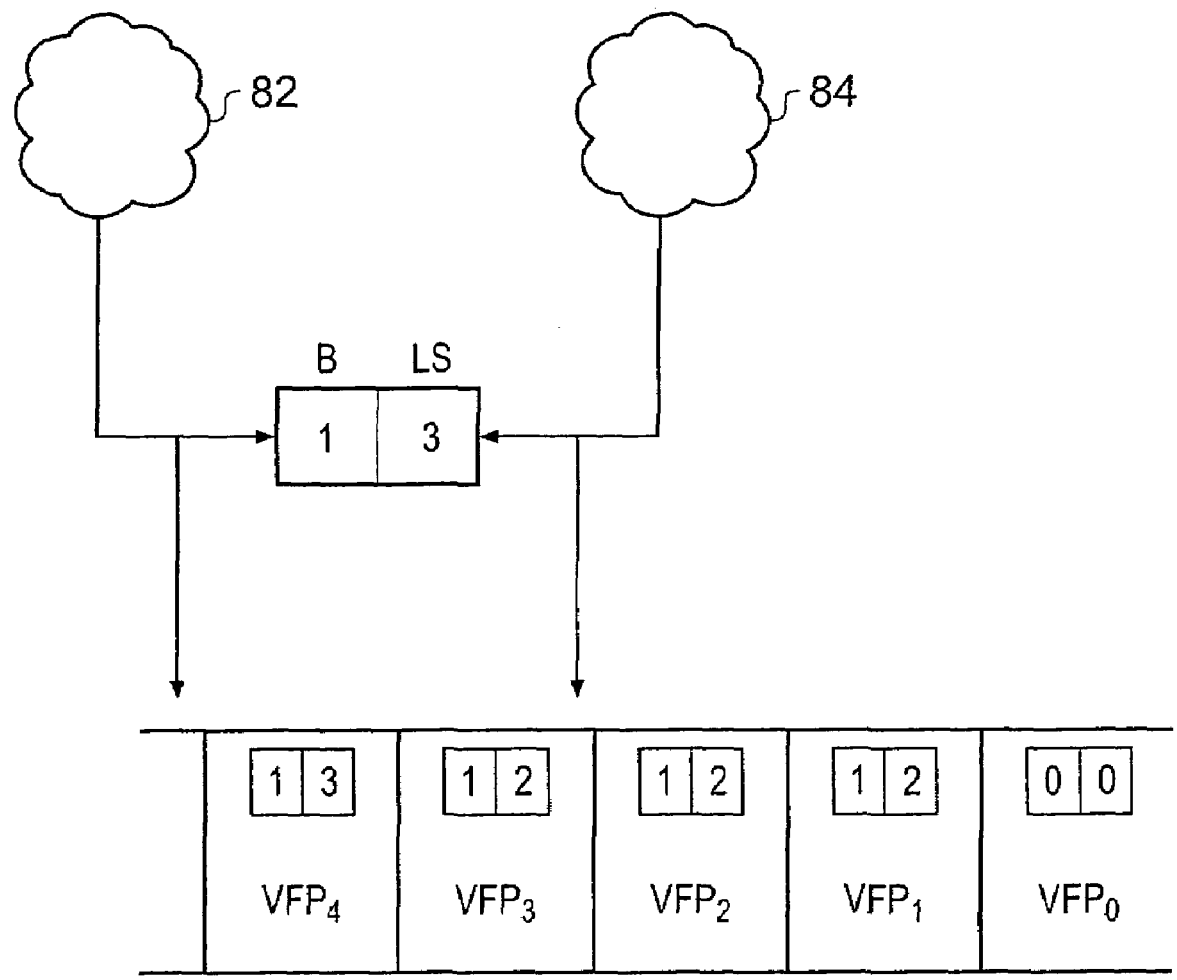
FIG. 5 shows a co-processor instruction stream for the embodiment of FIG. 4.

FIG. 5 shows the embodiment of FIG. 4 in more detail and gives some example values for counters for an example instruction stream 40 which is the same as that shown in FIG. 3. The first floating point instruction $VFP_0$ has no exception instructions in front of it so the two counter values are set to zero and the instruction can complete. $VFP_1$, $VFP_2$ and $VFP_3$ have two load/store instructions and one branch instruction ahead of them and cannot complete until these three instructions have all been committed. $VFP_4$ has an additional load/store instruction in front of it and cannot complete until that instruction too has been committed.

Figure 6:
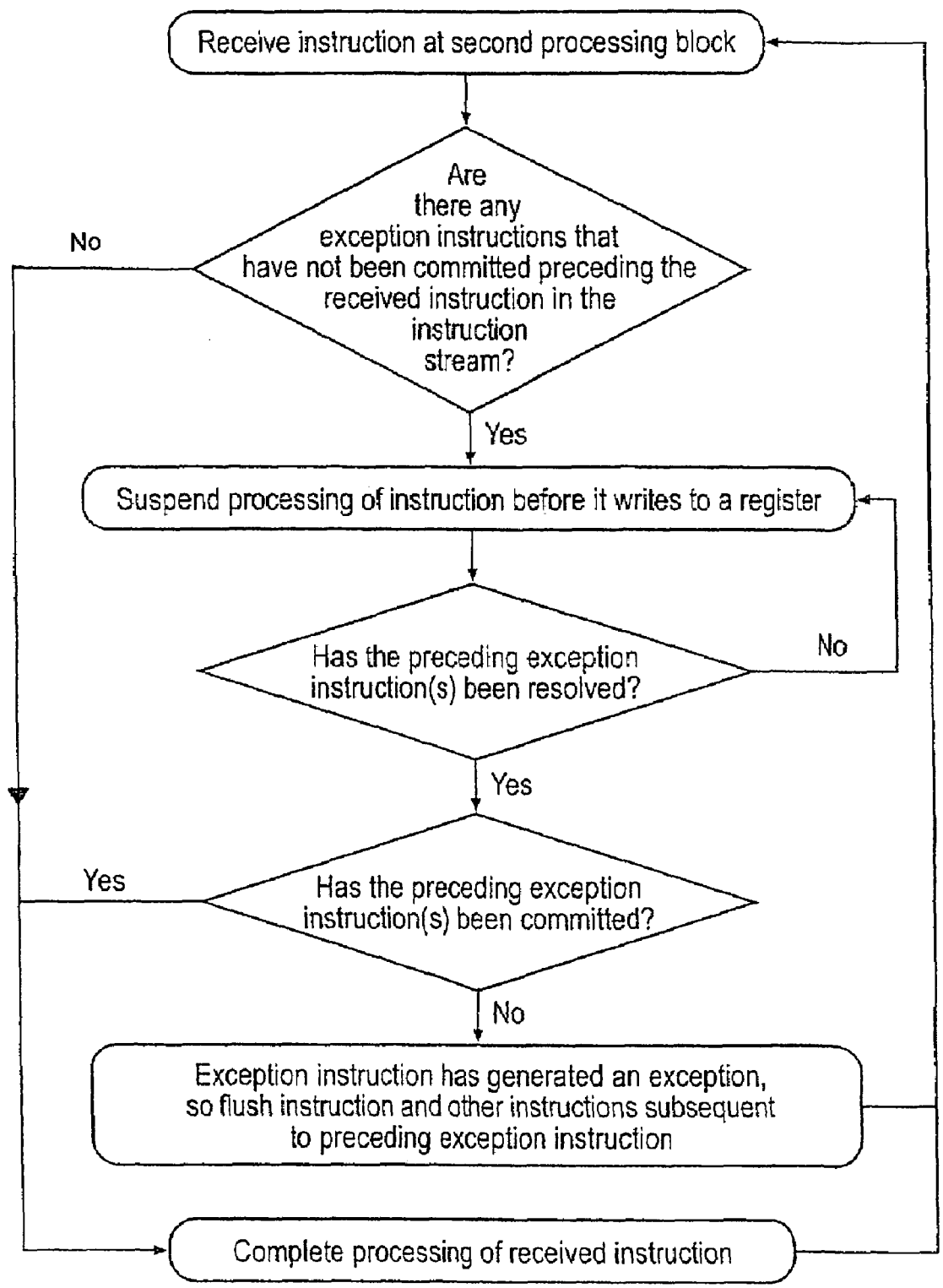
FIG. 6 shows a flow diagram showing the steps of a method according to an example embodiment.

FIG. 6 shows a flow diagram of a method according to an example embodiment. An instruction is received at the second processing block that does not support renaming, such as VFP 30 of FIG. 2. A check is made to see if there are any exception instructions preceding this instruction in the instruction stream that have not been resolved. This can be done in a number of ways such as using counters as is described above. If there are unresolved exception instructions, processing of the instruction is suspended before it writes to a register. Processing resumes when the preceding exception instructions are detected as being resolved. If there are no unresolved exception instructions then it is checked to see if the resolved exception instruction has been committed; if it has, then the received instruction is processed. If it has not been committed, then as it has been resolved, it must have generated an exception, and thus, the received instruction and indeed any other instruction subsequent to the exceptional exception instruction are flushed.

Although illustrative embodiments have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus operable to process a stream of instructions from an instruction set, said instruction set comprising exception instructions and non-exception instructions, exception instructions being instructions that may cause a break in an instruction flow and non-exception instructions being instructions that execute in a statically determinable way, said data processing apparatus comprising:

at least two processing blocks for processing instructions from said stream of instructions;

a first processing block having a set of physical registers associated with it for storing data values being processed by said first processing block, and renaming circuitry associated with said first processing block for mapping architectural registers specified in instructions to be processed by said first processing block to physical registers within said set of physical registers;

a second processing block having a set of physical registers associated with it for storing data values being processed by said second processing block, said second processing block registers not supporting renaming;

control circuitry configured to identify exception instructions in said instruction stream and to detect when said exception instructions have been committed;

said second processing block being configured to receive signals from said control circuitry and to suspend processing of an instruction in said second processing block until all preceding exception instructions have been committed, wherein said control circuitry comprises a global counter and is configured to analyse said instruction stream prior to said instructions being issued to said processing blocks and to update said global counter in response to detection of one of said exception instructions and for each instruction to be processed by said second processing block to update an instruction counter associated with said instruction with a value of said global counter, such that said instruction counter indicates a number of unresolved exception instructions preceding said instruction in said instruction stream;

said control circuitry being responsive to detection of an oldest unresolved exception instruction being committed to generate a committed signal; and said control circuitry being responsive to said committed signal to update said global counter and instruction counters, said second processing block suspending processing of instructions in dependence upon said instruction counter values.

2. A data processing apparatus according to claim 1, wherein said control circuitry is responsive to detecting an exception instruction generating an exception to generate a flush signal; and said second processing block is responsive to said flush signal to flush instructions in said second processing block subsequent in said instruction stream to said exception instruction generating said exception.

3. A data processing apparatus according to claim 1, wherein said suspension of processing of said instruction by said second processing block is performed prior to said instruction updating a register.

4. A data processing apparatus according to claim 1, wherein said second processing block comprises a co-processor to said first processing block.

5. A data processing apparatus according to claim 4, wherein said co-processor comprises a floating point unit.

6. A data processing apparatus according to claim 1, further comprising:

an exception data store for storing information regarding exception instructions to be processed by said first processing block that are not yet committed;

said control circuitry being configured to store information regarding said exception instructions in said exception data store, and to identify instructions in said instruction stream to be processed by said second processing block subsequent to an exception instruction in said instruction stream, and to mark a first instruction to be processed by said second processing block in said instruction stream subsequent to an exception instruction and to mark said exception instruction as a corresponding exception instruction within said exception data store;

said second processing block being responsive to detection of a marked instruction to suspend processing of said marked instruction prior to said marked instruction updating a register until detection of a signal indicating that said corresponding marked exception instruction has been committed.

7. A data processing apparatus according to claim 6, wherein said exception data store comprises a FIFO, and said control circuitry is responsive to detection of an exception instruction being committed to mark said exception data store entry corresponding to said exception instructions as committed and to pop said corresponding data entry off said FIFO if said corresponding data entry is at the exit of said FIFO.

8. A data processing apparatus according to claim 6, wherein said second processing block is configured to process non-marked instructions until a subsequent marked instruction in a stream of instructions sent to said second processing block is detected and to suspend processing of said second data processing block before said marked instruction updates a register until receipt of a signal indicating said corresponding marked exception instruction is committed.

9. A data processing apparatus according to claim 1, wherein said control circuitry is responsive to detection of an oldest unresolved exception instruction to generate an exception to generate a flush signal; and said second processing block is responsive to said flush signal to flush instructions from said second processing block in dependence upon said instruction counter values.

10. A data processing apparatus according to claim 1, wherein said exception instructions comprise at least two types of exception instruction said at least two types of exception instructions executing in an order of said instruction stream with respect to other exception instructions of their type, said control circuitry comprises at least two corresponding global counters and a plurality of instruction counters, said control circuitry being operable to update respective global counters in response to detection of their respective type of exception instruction in said instruction stream and for each instruction to be processed by said second processing block to update a respective at least two instruction counters associated with said instruction with values from said at least two global counters, such that said instruction counters indicate a number of unresolved exception instructions of different types preceding said instruction in said instruction stream;

said control circuitry being responsive to detection of one of said unresolved exception instructions generating an exception to generate a flush signal indicating a type of instruction that has generated said flush signal and to detection of an unresolved exception instruction of a certain type being committed to generate a committed signal indicating said certain type;

said control circuitry being responsive to said committed signal to update said respective global counters and instruction counters relating to said type of exception, said second processing block suspending processing of instructions in dependence upon said instruction counter values; and said second processing block being responsive to said flush signal to flush instructions from said second processing block in dependence upon said instruction counter values.

11. A data processing apparatus according to claim 1, wherein said exception instructions comprises at least one of a load instruction, a store instruction and a branch instruction.

12. A data processing apparatus according to claim 11, wherein a first type of exception instruction comprises a load or a store instruction and a second type of instruction comprises a branch instruction.

13. A method of processing a stream of instructions from an instruction set, said instruction set comprising exception instructions and non-exception instructions, exception instructions being instructions that may cause a break in an instruction flow and non-exception instructions being instructions that execute in a statically determinable way, said instructions being suitable for being processed by at least one of said two processing blocks, a first processing block supporting register renaming and a second processing block not supporting register renaming, said method comprising the steps of:
  identifying exception instructions in said instruction stream and detecting when they have been committed; and
  suspending processing of an instruction in said second processing block until all preceding exception instructions in said instruction stream have been committed, the method further comprising:
  analyzing said instruction stream prior to said instructions being issued to said processing blocks;
  updating a global counter in response to detection of one of said exception instructions;
  for each instruction to be processed by said second processing block, updating an instruction counter associated with said instruction with a value of said global counter such that said instruction counter indicates a number of unresolved exception instructions preceding said instruction in said instruction stream;
  in response to detection of an oldest unresolved exception instruction being committed, generating a committed signal;
  in response to said committed signal, updating said global counter and instruction counters; and
  said second processing block suspending processing of instructions in dependence upon said instruction counter values.

14. An apparatus for processing a stream of instructions from an instruction set, said instruction set comprising exception instructions and non-exception instructions, exception instructions being instructions that may cause a break in an instruction flow and non-exception instructions being instructions that execute in a statically determinable way, said apparatus comprising:
  at least two processing means for processing respective instructions from said stream of instructions;
  a first processing means having a set of physical registers associated with it for storing data values being processed by said first processing means,
  renaming means associated with said first processing means for mapping architectural registers specified in instructions to be processed by said first processing means to physical registers within said set of physical registers;
  a second processing means having a set of physical registers associated with it for storing data values being processed by said second processing means, said second processing means registers not supporting renaming;
  control means for identifying exception instructions to be processed in said instruction stream and for detecting when said exception instructions have been committed; and
  said second processing means being configured to receive signals from said control means and to suspend processing of an instruction in said second processing means until all preceding exception instructions have been committed,
  wherein said control means comprises a global counter and is configured to analyse said instruction stream prior to said instructions being issued to said processing blocks and to update said counter in response to detection of one of said exception instructions and for each instruction to be processed by said second processing means to update an instruction counter associated with said instruction with a value of said global counter, such that said instruction counter indicates a number of unresolved exception instructions preceding said instruction in said instruction stream;
  said control means being responsive to detection of an oldest unresolved exception instruction being committed to generate a committed signal; and
  said control means being responsive to said committed signal to update said global counter and instruction counters, said second processing means suspending processing of instructions in dependence upon said instruction global counter values.

15. A data processing apparatus operable to process a stream of instructions from an instruction set, said instruction set comprising exception instructions and non-exception instructions, exception instructions being instructions that may cause a break in an instruction flow and non-exception instructions being instructions that execute in a statically determinable way, said data processing apparatus comprising:
  at least two processing blocks for processing instructions from said stream of instructions;
  a first processing block having a set of physical registers associated with it for storing data values being processed by said first processing block, and renaming circuitry associated with said first processing block for mapping architectural registers specified in instructions to be processed by said first processing block to physical registers within said set of physical registers;
  a second processing block having a set of physical registers associated with it for storing data values being processed by said second processing block, said second processing block registers not supporting renaming;
  control circuitry configured to identify exception instructions in said instruction stream and to detect when said exception instructions have been committed;
  said second processing block being configured to receive signals from said control circuitry and to suspend processing of an instruction in said second processing block until all preceding exception instructions have been committed;
  said apparatus further comprising:
  an exception data store for storing information regarding exception instructions to be processed by said first processing block that are not yet committed;
  said control circuitry being configured to store information regarding said exception instructions in said exception data store, and to identify instructions in said instruction stream to be processed by said second processing block subsequent to an exception instruction in said instruction stream, and to mark a first instruction to be processed by said second processing block in said instruction stream subsequent to an exception instruction and to mark said exception instruction as a corresponding exception instruction within said exception data store;

said second processing block being responsive to detection of a marked instruction to suspend processing of said marked instruction prior to said marked instruction updating a register until detection of a signal indicating that said corresponding marked exception instruction has been committed;

wherein said second processing block comprises a global counter and instruction counters, said second processing block being responsive to receipt of an instruction to update a counter associated with said received instruction with a value of said global counter, and being responsive to receipt of a marked instruction to update said global counter, and being responsive to receipt of a signal indicating that a marked instruction in said exception data store is committed to update said global counter and instruction counters in an opposite direction, said second processing block being responsive to a predetermined value of an instruction counter to determine if said instruction is to be allowed to update a register or not.

16. A data processing apparatus according to claim 15, wherein said control circuitry is responsive to detecting an exception instruction generating an exception to generate a flush signal; and said second processing block is responsive to detection of a flush signal from said control circuitry to flush instructions from said processing block in dependence upon their counter values.

17. A method of processing a stream of instructions from an instruction set, said instruction set comprising exception instructions and non-exception instructions, exception instructions being instructions that may cause a break in an instruction flow and non-exception instructions being instructions that execute in a statically determinable way, said instructions being suitable for being processed by at least one of said two processing blocks, a first processing block supporting register renaming and a second processing block not supporting register renaming, said method comprising the steps of:

identifying exception instructions in said instruction stream and detecting when they have been committed;

suspending processing of an instruction in said second processing block until all preceding exception instructions in said instruction stream have been committed, the method further comprising:

storing in an exception data store information regarding exception instructions to be processed by said first processing block that are not yet committed;

identifying instructions in said instruction stream to be processed by said second processing block subsequent to an exception instruction in said instruction stream;

marking a first instruction to be processed by said second processing block in said instruction stream subsequent to an exception instruction and to mark said exception instruction as a corresponding exception instruction within said exception data store;

said second processing block being responsive to detection of a marked instruction to suspend processing of said marked instruction prior to said marked instruction updating a register until detection of a signal indicating that said corresponding marked exception instruction has been committed;

wherein said second processing block comprises a global counter and instruction counters, said second processing block being responsive to receipt of an instruction to update a counter associated with said received instruction with a value of said global counter, and being responsive to receipt of a marked instruction to update said global counter, and being responsive to receipt of a signal indicating that a marked instruction in said exception data store is committed to update said global counter and instruction counters in an opposite direction, said second processing block being responsive to a predetermined value of an instruction counter to determine if said instruction is to be allowed to update a register or not.

18. An apparatus for processing a stream of instructions from an instruction set, said instruction set comprising exception instructions and non-exception instructions, exception instructions being instructions that may cause a break in an instruction flow and non-exception instructions being instructions that execute in a statically determinable way, said apparatus comprising:

at least two processing means for processing respective instructions from said stream of instructions;

a first processing means having a set of physical registers associated with it for storing data values being processed by said first processing means, and renaming means associated with said first processing means for mapping architectural registers specified in instructions to be processed by said first processing means to physical registers within said set of physical registers;

a second processing means having a set of physical registers associated with it for storing data values being processed by said second processing means, said second processing means registers not supporting renaming;

control means for identifying exception instructions to be processed in said instruction stream and for detecting when said exception instructions have been committed; and said second processing means being configured to receive signals from said control means and to suspend processing of an instruction in said second processing means until all preceding exception instructions have been committed, said apparatus further comprising:

an exception data store means for storing information regarding exception instructions to be processed by said first processing means that are not yet committed;

said control means being configured to store information regarding said exception instructions in said exception data store means, and to identify instructions in said instruction stream to be processed by said second processing means subsequent to an exception instruction in said instruction stream, and to mark a first instruction to be processed by said second processing means in said instruction stream subsequent to an exception instruction and to mark said exception instruction as a corresponding exception instruction within said exception data store means;

said second processing means being responsive to detection of a marked instruction to suspend processing of said marked instruction prior to said marked instruction updating a register until detection of a signal indicating that said corresponding marked exception instruction has been committed;

wherein said second processing means comprises a global counter means for counting and instruction counter means for counting, said second processing means being responsive to receipt of an instruction to update an instruction counter means associated with said received instruction with a value of said global counter means, and being responsive to receipt of a marked instruction to update said global counter means, and being responsive to receipt of a signal indicating that a marked instruction in said exception data store means is committed to update said global counter means and instruction counter means in an opposite direction, said second processing means being responsive to a predetermined value of an instruction counter means to determine if said instruction is to be allowed to update a register or not.

* * * * *